United States Patent [19]
Tokumaru

[11] Patent Number: 4,516,839
[45] Date of Patent: May 14, 1985

[54] ZOOM LENS SYSTEM
[75] Inventor: Hisashi Tokumaru, Osaka, Japan
[73] Assignee: Minolta Camera Kabushiki Kaisha, Osaka, Japan
[21] Appl. No.: 393,492
[22] Filed: Jun. 29, 1985
[30] Foreign Application Priority Data
  Jun. 30, 1981 [JP] Japan ................. 56-102669
[51] Int. Cl.³ .................. G02B 9/64; G02B 15/18
[52] U.S. Cl. ........................... 350/426; 350/427; 350/428
[58] Field of Search ............ 350/426, 427, 428
[56] References Cited
   U.S. PATENT DOCUMENTS
   3,771,853  11/1973  Nakamura .............. 350/426
   4,198,126   4/1980  Abe et al. .............. 350/427
   FOREIGN PATENT DOCUMENTS
   55-14403   4/1980  Japan .

*Primary Examiner*—John K. Corbin
*Assistant Examiner*—Rebecca D. Gass
*Attorney, Agent, or Firm*—Jackson, Jones & Price

[57] ABSTRACT

A zoom lens system comprising a first lens group of a negative refractive power, a second lens group of a positive refractive power located on the image side of the first lens group with a first variable air space, a third lens group of a negative refractive power located on the image side of the second lens group with a second variable air space and a fourth lens group or unit of a positive refractive power located on the image side of the third lens group with a third variable air space is provided. The first and third variable air spaces are reduced and the second variable air space is increased in accordance with the increase of the focal length of the whole lens system during the zooming. The absolute value of the focal length of the third lens group is greater than that of the second lens group.

13 Claims, 60 Drawing Figures

F/4.1
f=83.0
-0.5 0.5
Spherical Aberration
Sine Condition y'=21.63
-0.5 0.5
Astigmatism y'=21.63
-5 5 (%)
Distortion F/4.1
f=50.0
-0.5 0.5
Spherical Aberration
Sine Condition y'=21.63
-0.5 0.5
Astigmatism y'=21.63
-5 5 (%)
Distortion F/4.1
f=28.7
-0.5 0.5
Spherical Aberration
Sine Condition y'=21.63
-0.5 0.5
Astigmatism y'=21.63
-5 5 (%)
Distortion FIG.15a  FIG.15b  FIG.15c
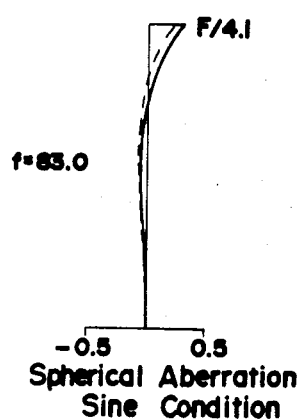
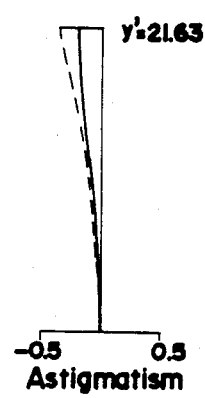
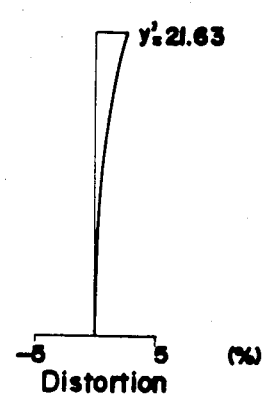
FIG.16a  FIG.16b  FIG.16c
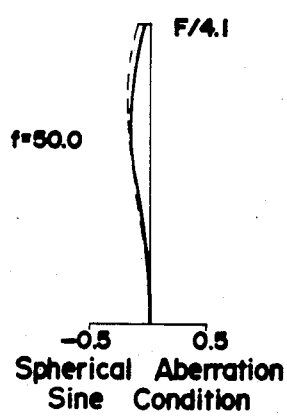
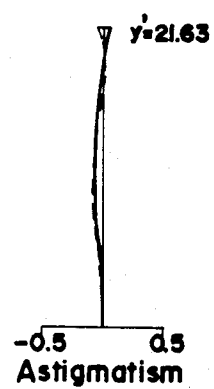
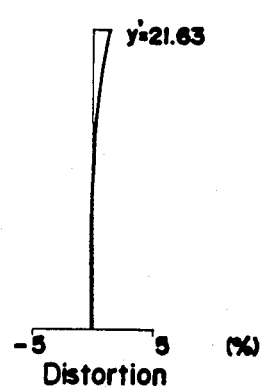
FIG.17a  FIG.17b  FIG.17c
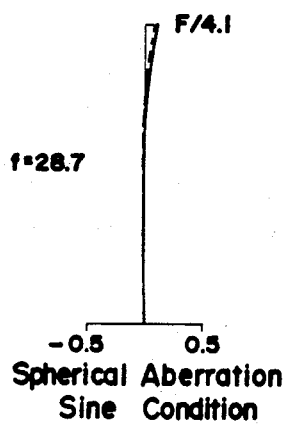
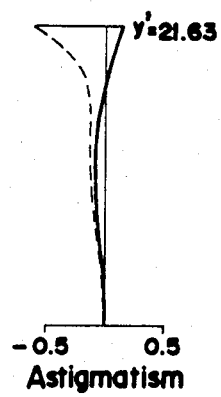
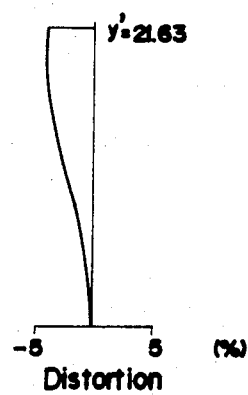

Spherical Aberration
Sine Condition

Astigmatism

Distortion

ZOOM LENS SYSTEM

BACKGROUND OF THE INVENTION

1. Field of the Invention

The present invention relates to a zoom lens system of a high zoom ratio of about 3, ranging from a telephoto to a considerably wide field angle for use in a still camera, such as 35 mm SLR cameras.

2. Description of the Prior Art

In this field of art, there has been various attempts to provide a zoom lens system of a relatively high zoom ratio ranging to wide field angle. Prior art zoom lens systems provided through such attempts can be roughly classified into two types, the first one having a negative front lens group, while the second one having a positive front lens group.

The first type is in its nature favorable to the purpose of providing a wide angle zoom lens system ranging to a considerably wide field angle, while it is unfavorable to the reduced total length and the compactness of the lens system. A most popular and simplified zoom lens system classified into the first type is a so-called two-group zoom lens system consisting of a negative front lens group and a positive rear lens group. Although such a two-group zoom lens system is suitable for a limited zoom ratio, such as 2, it is difficult to further increase the zoom ratio.

On the other hand, in the second type of zoom lens system with the front positive lens group, if the zoom range is extended to reach a focal length less than the length of a diagonal line across the effective image plane, focusing by means of moving the front positive lens group is difficult or the diameter of the front positive lens group excessively increased. A typical example of a zoom lens system classified into the second type is a so-called four-group zoom lens system consisting of a front focusing lens group, a variator lens group, a compensator lens group and a relay lens group. In such a four-group zoom lens system, if the zoom range is extended to a focal length of less than 40 mm with the focusing capability provided by means of the front lens group and the compactness of the whole lens system maintained, the focal lengths of the front lens group and the variator lens group become excessively short and cause various aberrations which are difficult correct.

An example of a zoom lens system of a high zoom ratio ranging from a telephoto to a wide field angle is disclosed in Japanese Patent Publication No. 55-14403.

The prior art is still seeking to provide a relatively compact and economical zoom lens system having a relatively high zoom ratio ranging to the wide angle range with an adequate optical correction.

SUMMARY OF THE INVENTION

An object of the present invention is to provide a zoom lens system with a relatively high zoom ratio of about 3 ranging to a wide field angle of about 76 degrees while maintaining a compact size.

Another object of the present invention is to provide a zoom lens system with aberrations well corrected across the entire zoom range.

According to the present invention, the zoom lens system comprises, from the object to the image side, a first negative lens group, a second positive lens group, a third negative lens group and a fourth positive lens group or unit with a first to third variable air spaces formed therebetween, respectively. And, the zoom lens system functions as an inverted telephoto type lens system in the shorter focal length range of the whole lens system by means of a combination of only the first lens group as a front negative group and the whole of the second to fourth lens groups as a rear positive group, while the zoom lens system functions as a telephoto type lens system in the longer focal length range of the whole lens system by means of a combination of the whole of the first and second lens groups as a front positive group and the whole of the third and fourth lens groups as a rear negative group. The above functions are achieved by means of reducing the first and third variable air spaces and increasing the second variable air space in accordance with the increase of the focal length of the whole lens system during zooming. The present invention is further characterized by the following conditions:

$$1 < \frac{|f_3|}{f_2} < 2$$

$$1.5 f_w < f_4 < 10 f_w$$

wherein $f_2$ represents the focal length of the second lens group, $f_3$ represents the focal length of the third lens group, $f_4$ represents the focal length of the fourth lens group, and $f_w$ represents the shortest focal length of the whole lens system.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

BRIEF DESCRIPTION OF THE DRAWINGS

FIGS. 15a to 15c represent the aberration curves of the fourth embodiment for the longest focal length;

FIGS. 16a to 16c represent the aberration curves of the fourth embodiment for a medium focal length;

FIGS. 17a to 17c represent the aberration curves of the fourth embodiment for the shortest focal length;

DETAILED DESCRIPTION OF THE PREFERRED EMBODIMENTS

Figure 1:
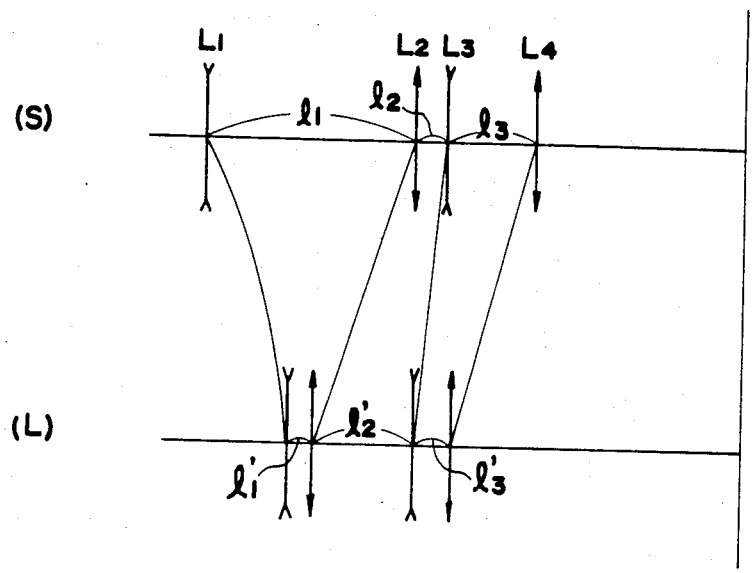
FIG. 1 represents a schematic view for showing the lens group movements in the lens system according to the present invention between the shortest and longest focal lengths.
Figure 2:
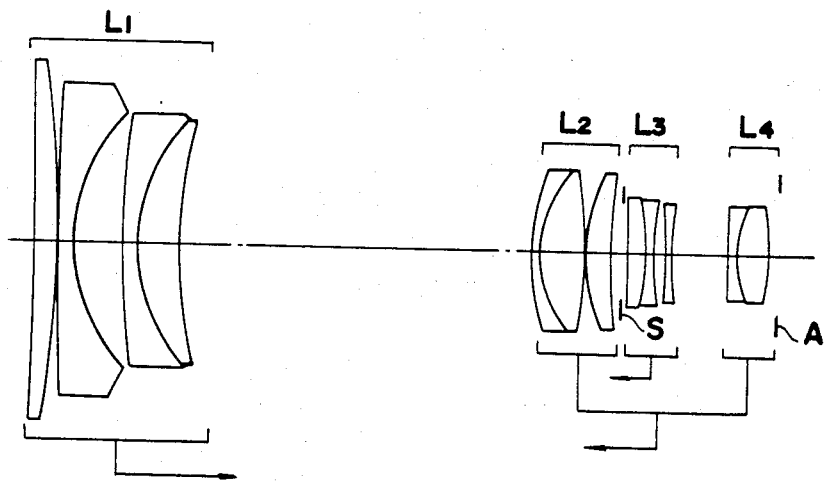
FIG. 2 represents a cross sectional view of the lens system according to a first embodiment of the present invention for the shortest focal length.
Figure 3A:
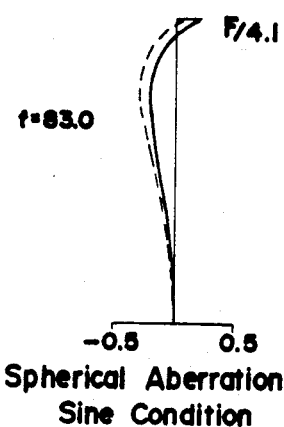
FIGS. 3a to 3c represent the aberration curves of the first embodiment for the longest focal length.
Figure 3B:
Figure 3C:
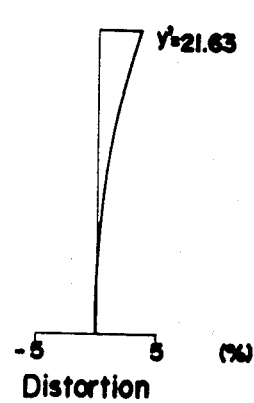
Figure 4A:
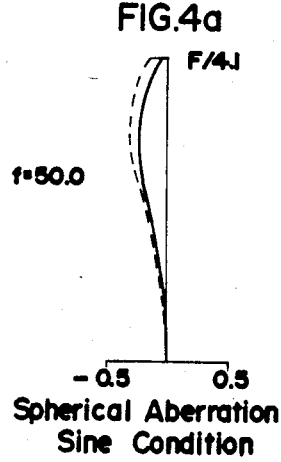
FIGS. 4a to 4c represent the aberration curves of the first embodiment for a medium focal length.
Figure 4B:
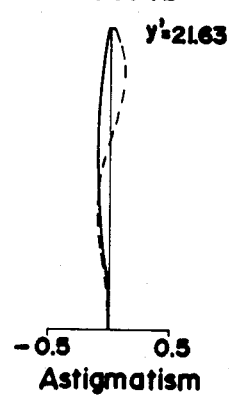
Figure 4C:
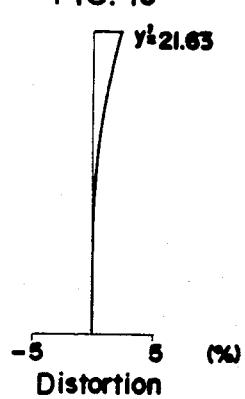
Figure 5A:
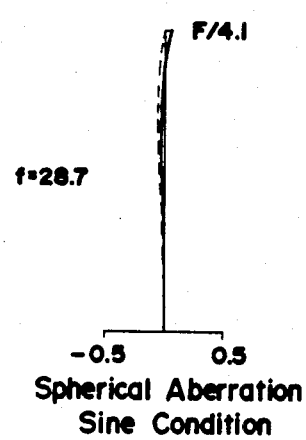
FIGS. 5a to 5c represent the aberration curves of the first embodiment for the shortest focal length.
Figure 5B:
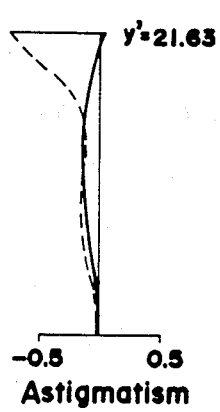
Figure 5C:
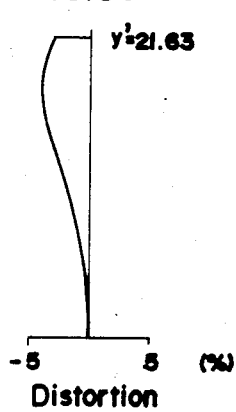
Figure 6:
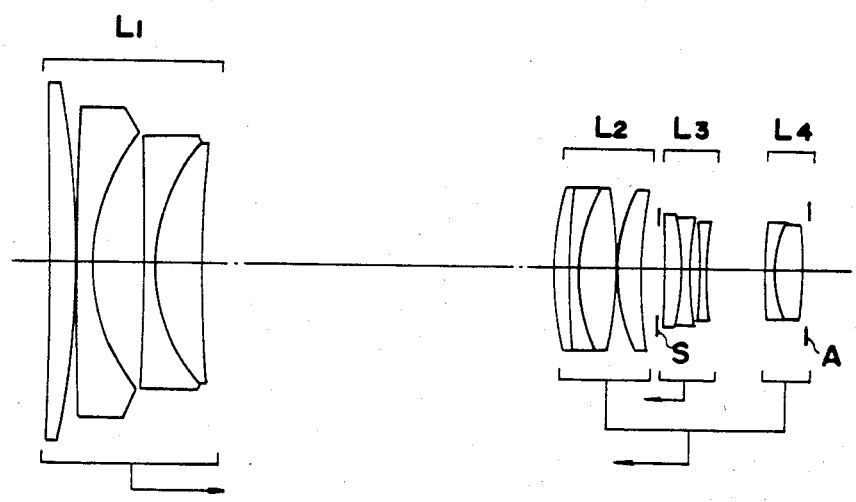
FIG. 6 represents a cross sectional view of the lens system according to a second embodiment of the present invention for the shortest focal length.
Figure 7A:
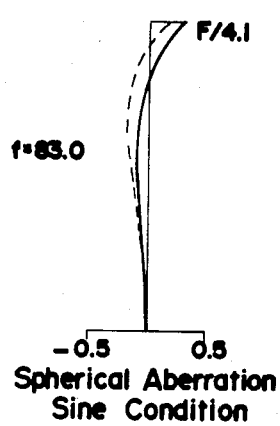
FIGS. 7a to 7c represent the aberration curves of the second embodiment for the longest focal length.
Figure 7B:
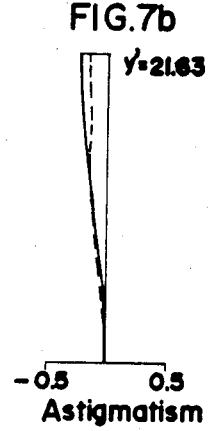
Figure 7C:
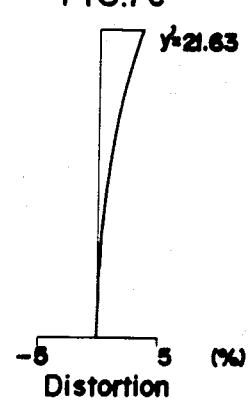
Figure 8A:
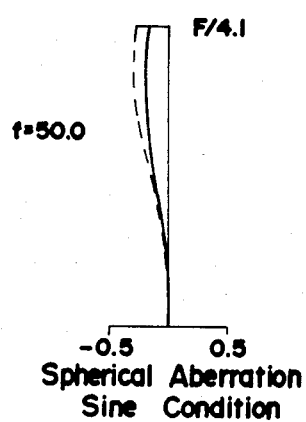
FIGS. 8a to 8b represent the aberration curves of the second embodiment for a medium focal length.
Figure 8B:
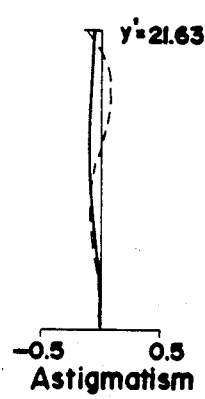
Figure 8C:
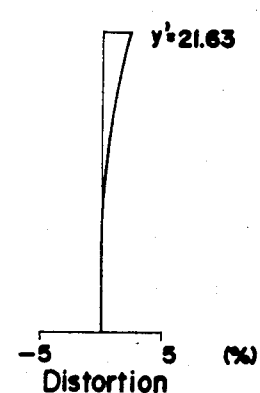
Figure 9A:
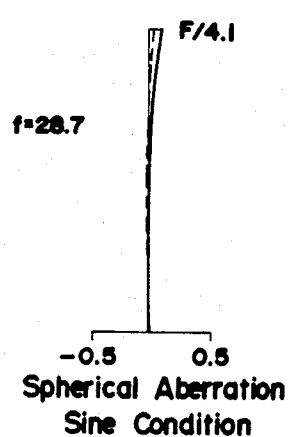
FIGS. 9a to 9b represent the aberration curves of the second embodiment for the shortest focal length.
Figure 9B:
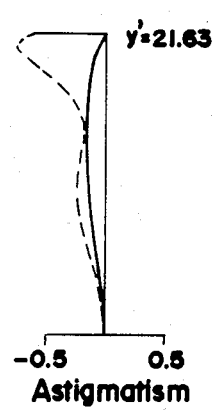
Figure 9C:
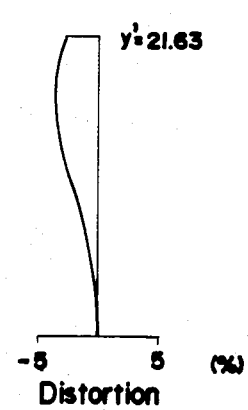
Figure 10:
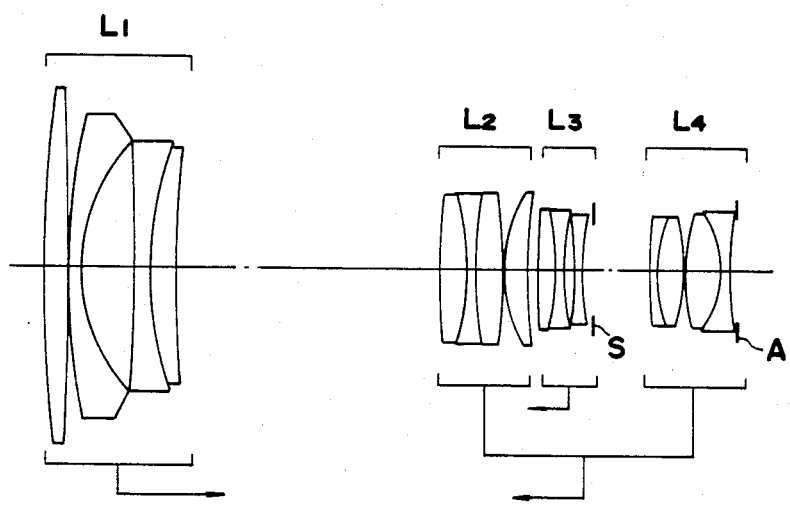
FIG. 10 represents a cross sectional view of the lens system according to a third embodiment of the present invention for the shortest focal length.
Figure 11A:
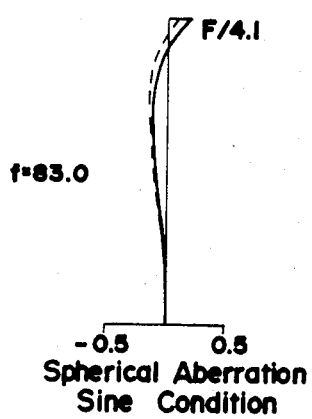
FIGS. 11a to 11c represent the aberration curves of the third embodiment for the longest focal length.
Figure 11B:
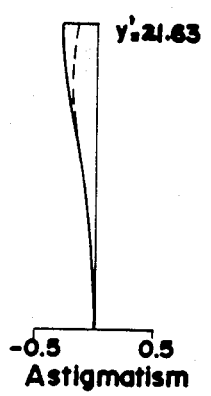
Figure 11C:
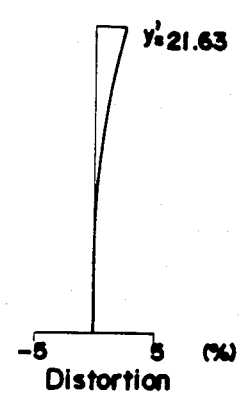
Figure 12A:
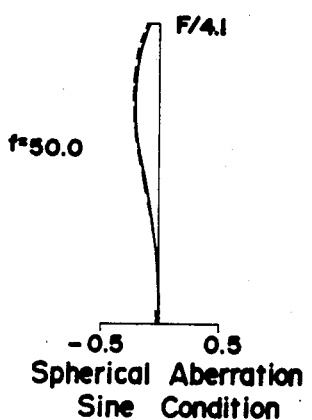
FIGS. 12a to 12c represent the aberration curves of the third embodiment for a medium focal length.
Figure 12B:
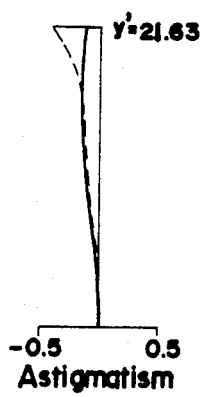
Figure 12C:
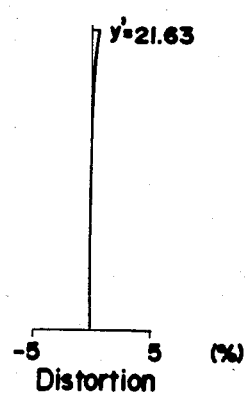
Figure 13A:
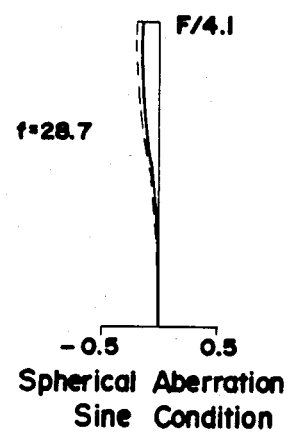
FIGS. 13a to 13c represent the aberration curves of the third embodiment for the shortest focal length.
Figure 13B:
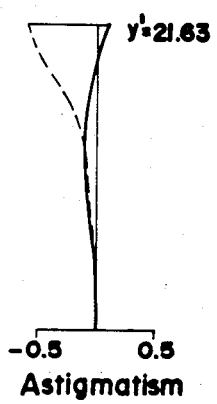
Figure 13C:
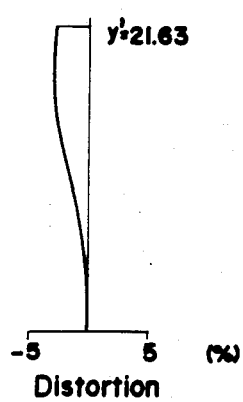

The following description is provided to enable any person skilled in the optical and camera field to make and use the invention and sets forth the best modes contemplated by the inventor for carrying out his invention. Various modifications, however, will remain readily apparent to those skilled in the art, since the generic principles of the present invention have been defined herein specifically to provide a relatively economical and easily manufactured compact zoom lens system. The derivation of the formulas and the relation of the powers set forth herein can be accomplished with the assistance of a computer. The present invention represents the parameters of a compromise balance of acceptable aberrations which can be relatively easily manufactured to provide a low cost lens system for utilization with a 35 mm SLR camera.

In the drawings, schematic cross sectional views disclose the position of the lens groups and lens elements for the shortest focal length with arrows below the lens groups representing the directions of their movements for zooming toward the longest focal length. Due to the number of lens elements involved, it was not deemed appropriate to include individual designation of the radii of curvature and axial distances for each lens element and air space. These values, however, are provided in the accompanying Tables set forth herein, and the schematic cross sectional views of the respective embodiments follow the normal conventions of an object at the left-hand side of the drawing and the image plane at the right-hand side.

As disclosed in FIGS. 2, 6, 10, 14 and 18 the present invention provides a compact zoom lens system of a relatively high zoom ratio, ranging to a considerably wide field angle and comprising a first lens group ($L_1$) of a negative refractive power, a second lens group ($L_2$) of a positive refractive power located on the image side of the first lens group with a first variable air space ($l_1$), a third lens group ($L_3$) of a negative refractive power located on the image side of the second lens group with a second variable air space ($l_2$), and a fourth lens group or unit ($L_4$) of a positive refractive power located on the image side of the third lens group with a third variable air space ($l_3$), wherein said first and third variable air spaces ($l_1$ and $l_3$) are reduced and said second variable air space ($l_2$) is increased in accordance with the increase of the focal length of the whole lens system during the zooming, and wherein the lens system fulfills the following condition:

$$1 < \frac{|f_3|}{f_2} < 2 \tag{1}$$

wherein $f_2$ represents the focal length of the second lens group ($L_2$); and $f_3$ represents the focal length of the third lens group ($L_3$).

The lens system according to the present invention further fulfills the following condition:

$$1.5 f_w < f_4 < 10 f_w \tag{2}$$

wherein $f_4$ represents the focal length of the fourth lens group or unit ($L_4$), and $f_w$ represents the shortest focal length of the whole lens system.

The lens system according to the present invention still further fulfills the following conditions:

$$f_2 < |f_1| \tag{3}$$

$$|f_3| < f_4 \tag{4}$$

$$7 \text{ mm} < l_3 < 20 \text{ mm} \tag{5}$$

wherein $f_1$ represents the focal length of the first lens group, and $l_3$ represents the greatest value for the third variable air space.

According to the present invention, the total length of the lens system is considerably reduced in the longest focal length side in comparison with a conventional two-group zoom lens system which consists of a negative front group and a positive rear group.

Further, the present invention is characterized by the method of correcting aberrations. In a conventional two-group zoom lens system, the aberrations caused by the front lens group and those by the rear lens group are individually corrected by themselves, respectively. Accordingly, the change in the air space between the lens groups for varying the focal length and the back focal distance of the whole lens system has little effect on the change in aberrations. In other words, the change in the air space is not positively utilized for correcting the change in aberrations caused by zooming. On the contrary, according to the present invention, the aberrations caused by the individual lens groups or units are partially left uncorrected in comparison with the conventional zoom lens system and are totally corrected by means of the changes in the variable air spaces. In other words, the changes in the variable air spaces during zooming are positively utilized for correcting aberrations all over the entire zoom range.

Refering to FIG. 1, which is for explaining the lens group movement of the lens system according to the present invention in more detail, the lens system fulfills the following conditions:

$$l_1 > l_1'$$

$l_2 < l_2'$ $l_3 > l_3'$ wherein $l_1$, $l_2$ and $l_3$ represent the first to third variable air spaces for the shortest focal length (S), respectively, while $l_1'$, $l_2'$ and $l_3'$ represent the first to third variable air spaces for the longest focal length (L), respectively. The condition, $l_1 > l_1'$ is necessary for realizing an inverted telephoto type in the shorter focal length side (S), while the condition, $l_2 < l_2'$ is necessary for realizing a telephoto type in the longer focal length side (L). With respect to the aberration correction, the spherical aberration and coma a among the various aberrations caused by the change in the first variable air space ($l_1$) for varying the focal length, and are corrected by the change in the second variable air space ($l_2$) according to the present invention. Further, the astigmatism caused by the change in the first variable air space ($l_1$) is corrected by the change in the third air space fulfilling the condition, $l_3 > l_3'$.

In the conditions refering to the relationships between the various focal lengths, conditions (3) and (4) are essential to realize a telephoto type in the longer focal length side (L).

With respect to condition (1), its lower limit means that the absolute value for the focal length of the third negative lens group ($L_3$) is greater than that of the second positive lens group ($L_2$). This is necessary for the change in the third variable air space ($l_3$) to effectively influence the astigmatism without substantially affecting the coma. If $f_2$ is greater than $|f_3|$, the overall focal length of the first to third lens groups would be negative in the shorter focal length side (S) to require an excessively great refractive power of the fourth positive lens group or unit ($L_4$) and, in turn, an excessively great refractive power of the third negative lens group ($L_3$) due to the requirement of condition (4). In this case, the change in the third air space ($l_3$) would have an undesirable effect on coma to a great degree and would fail in balancing the aberration corrections between the astigmatism and coma within the entire zoom range. On the other hand, if the upper limit of condition (1) is violated, not only the individual refractive powers of both the third and fourth lens groups but also the overall negative refractive power of the third and fourth lens groups in the longer focal length side (L) would be insufficient to result in an unsatisfactory telephoto ratio, which fails in making the lens system compact in the longer focal length side (L), although such insufficient refractive powers are favorable to aberration correction.

Condition (2) defines the refractive power of the fourth lens group or unit ($L_4$). If the lower limit is violated, it would be necessary to excessively increase the refractive power of the first lens group ($L_1$) for obtaining a desired back focal distance.

This causes excessive refractive powers for the second and third lens groups due to the requirement of conditions (1), (3) and (4). These excessive refractive powers of the lens groups would make it difficult to satisfactorily correct aberrations of the whole lens system, although the lens system may be compact. On the other hand, an excessively weak refractive power corresponding to the outside of the upper limit of the condition (2) would make the existance of the fourth lens group or unit ($L_4$) almost meaningless.

Condition (5) defines the third variable air space for the shortest focal length. An excessively narrow air space violating the lower limit of condition (5) means that the degree of change in the third variable air space is limited to results in an insufficient effect of correcting astigmatism and coma by means of the change in the third air space. It may be theoretically possible to require a sufficient effect of aberration correction of such a limited change in the third variable air space by means of making the aberrations greatly sensitive to the change in the third variable air space. However, it would be practically impossible to control the change in such a sensitive air space. On the other hand, if the upper limit is violated, the distortion and the field curvature would be greatly increased since a location of the aperture stop appropriate to the off-axial pencil in both the shorter focal length side and the longer focal length side is difficult.

The following Tables 1 to 5 disclose, respectively, the first through fifth embodiments of the present invention. In the Tables, f equals the focal length, r is the radius of curvature with respective sub numbers indicating the surfaces from the object to image side along the optical axis, d represents the axial distance and includes both the air spaces and the actual thickness of the lens elements along the optical axis, N equals the refractive index and again, the sub numbers refer to the particular optical element from the object to image side, and finally, $\nu$ equals the Abbe number and the sub numbers refer to the specific lens elements from the object to image side. The air space distances in the Tables provided with three separate values correspond to the values for the shortest, medium and longest focal lengths, respectively.

TABLE 1

[Example 1]
$f = 28.7 \sim 50.0 \sim 83.0$  $F_{No.} = 4.1$

| | | Radius of Curvature | Axial Distance | | Refractive Index | | Abbe Number |
|---|---|---|---|---|---|---|---|
| $L_1$ | $r_1$ | −1346.691 | | | | | |
| | | | $d_1$ 4.000 | $N_1$ | 1.51680 | $\nu_1$ | 64.12 |
| | $r_2$ | −175.382 | | | | | |
| | | | $d_2$ 0.150 | | | | |
| | $r_3$ | 518.632 | | | | | |
| | | | $d_3$ 2.500 | $N_2$ | 1.80741 | $\nu_2$ | 31.59 |
| | $r_4$ | 28.654 | | | | | |
| | | | $d_4$ 8.600 | | | | |
| | $r_5$ | 193.102 | | | | | |
| | | | $d_5$ 2.100 | $N_3$ | 1.51680 | $\nu_3$ | 64.12 |
| | $r_6$ | 27.382 | | | | | |
| | | | $d_6$ 7.100 | $N_4$ | 1.80518 | $\nu_4$ | 25.43 |
| | $r_7$ | 78.340 | | | | | |
| | | | $d_7$ 59.086∼22.095∼1.000 | | | | |
| $L_2$ | $r_8$ | 39.131 | | | | | |
| | | | $d_8$ 1.500 | $N_5$ | 1.80518 | $\nu_5$ | 25.43 |
| | $r_9$ | 20.790 | | | | | |
| | | | $d_9$ 7.500 | $N_6$ | 1.67000 | $\nu_6$ | 57.07 |
| | $r_{10}$ | −76.684 | | | | | |
| | | | $d_{10}$ 0.150 | | | | |
| | $r_{11}$ | 30.675 | | | | | |
| | | | $d_{11}$ 4.000 | $N_7$ | 1.67000 | $\nu_7$ | 57.07 |
| | $r_{12}$ | 100.011 | | | | | |
| | | | $d_{12}$ 3.000∼5.763∼10.823 | | | | |
| $L_3$ | $r_{13}$ | −183.420 | | | | | |
| | | | $d_{13}$ 3.000 | $N_8$ | 1.75520 | $\nu_8$ | 27.51 |
| | $r_{14}$ | −38.057 | | | | | |
| | | | $d_{14}$ 1.300 | $N_9$ | 1.69680 | $\nu_9$ | 55.43 |
| | $r_{15}$ | 57.414 | | | | | |
| | | | $d_{15}$ 1.800 | | | | |
| | $r_{16}$ | −410.268 | | | | | |
| | | | $d_{16}$ 1.300 | $N_{10}$ | 1.60311 | $\nu_{10}$ | 60.74 |
| | $r_{17}$ | 69.570 | | | | | |
| | | | $d_{17}$ 9.322∼6.559∼1.499 | | | | |
| $L_4$ | $r_{18}$ | 188.113 | | | | | |
| | | | $d_{18}$ 1.200 | $N_{11}$ | 1.80700 | $\nu_{11}$ | 39.71 |
| | $r_{19}$ | 15.601 | | | | | |

TABLE 1-continued

[Example 1]
$f = 28.7 \sim 50.0 \sim 83.0 \quad F_{No.} = 4.1$

| | Radius of Curvature | Axial Distance | Refractive Index | Abbe Number |
|---|---|---|---|---|
| | | $d_{19}$ 6.000 | $N_{12}$ 1.60000 | $\nu_{12}$ 64.38 |
| $r_{20}$ | −43.142 | | | |

$\Sigma d = 123.608 \sim 86.617 \sim 65.522$
$f_1 = -48.309, f_2 = 27.201, f_3 = -39.318, f_4 = 185.391$

TABLE 2

[Example 2]
$f = 28.7 \sim 50.0 \sim 83.0 \quad F_{No.} = 4.1$

| | | Radius of Curvature | Axial Distance | Refractive Index | Abbe Number |
|---|---|---|---|---|---|
| $L_1$ | $r_1$ | −707.864 | | | |
| | | | $d_1$ 4.000 | $N_1$ 1.51680 | $\nu_1$ 64.12 |
| | $r_2$ | −161.313 | | | |
| | | | $d_2$ 0.150 | | |
| | $r_3$ | 1950.952 | | | |
| | | | $d_3$ 2.500 | $N_2$ 1.80741 | $\nu_2$ 31.59 |
| | $r_4$ | 32.350 | | | |
| | | | $d_4$ 8.600 | | |
| | $r_5$ | −1704.971 | | | |
| | | | $d_5$ 2.100 | $N_3$ 1.61720 | $\nu_3$ 54.00 |
| | $r_6$ | 31.516 | | | |
| | | | $d_6$ 7.500 | $N_4$ 1.80518 | $\nu_4$ 25.43 |
| | $r_7$ | 183.409 | | | |
| | | | $d_7$ 59.000 $\sim$ 21.696 $\sim$ 1.000 | | |
| $L_2$ | $r_8$ | 49.814 | | | |
| | | | $d_8$ 2.500 | $N_5$ 1.69680 | $\nu_5$ 55.43 |
| | $r_9$ | 106.016 | | | |
| | | | $d_9$ 1.500 | $N_6$ 1.80518 | $\nu_6$ 25.43 |
| | $r_{10}$ | 27.316 | | | |
| | | | $d_{10}$ 6.500 | $N_7$ 1.69350 | $\nu_7$ 50.29 |
| | $r_{11}$ | −72.798 | | | |
| | | | $d_{11}$ 0.150 | | |
| | $r_{12}$ | 27.605 | | | |
| | | | $d_{12}$ 4.000 | $N_8$ 1.67000 | $\nu_8$ 57.07 |
| | $r_{13}$ | 77.232 | | | |
| | | | $d_{13}$ 4.000 $\sim$ 7.156 $\sim$ 12.334 | | |
| $L_3$ | $r_{14}$ | −240.154 | | | |
| | | | $d_{14}$ 3.000 | $N_9$ 1.80518 | $\nu_9$ 25.43 |
| | $r_{15}$ | −39.239 | | | |
| | | | $d_{15}$ 1.300 | $N_{10}$ 1.67000 | $\nu_{10}$ 57.07 |
| | $r_{16}$ | 60.219 | | | |
| | | | $d_{16}$ 1.709 | | |
| | $r_{17}$ | −122.343 | | | |
| | | | $d_{17}$ 1.200 | $N_{11}$ 1.69680 | $\nu_{11}$ 55.43 |
| | $r_{18}$ | 86.952 | | | |
| | | | $d_{18}$ 9.834 $\sim$ 6.678 $\sim$ 1.500 | | |
| $L_4$ | $r_{19}$ | 80.410 | | | |
| | | | $d_{19}$ 1.200 | $N_{12}$ 1.83400 | $\nu_{12}$ 37.05 |
| | $r_{20}$ | 15.056 | | | |
| | | | $d_{20}$ 5.000 | $N_{13}$ 1.60000 | $\nu_{13}$ 64.38 |
| | $r_{21}$ | −52.900 | 13 | | |

$\Sigma d = 125.743 \sim 88.439 \sim 67.743$
$f_1 = -48.089, f_2 = 28.495, f_3 = -39.659, f_4 = 156.735$

TABLE 3

[Example 3]
$f = 28.7 \sim 50.0 \sim 83.0 \quad F_{No.} = 4.1$

| | | Radius of Curvature | Axial Distance | Refractive Index | Abbe Number |
|---|---|---|---|---|---|
| $L_1$ | $r_1$ | 233.239 | | | |
| | | | $d_1$ 4.000 | $N_1$ 1.75000 | $\nu_1$ 25.14 |
| | $r_2$ | −1472.385 | | | |
| | | | $d_2$ 0.150 | | |
| | $r_3$ | 126.859 | | | |
| | | | $d_3$ 2.500 | $N_2$ 1.77250 | $\nu_2$ 49.77 |
| | $r_4$ | 31.104 | | | |
| | | | $d_4$ 8.800 | | |
| | $r_5$ | −301.349 | | | |
| | | | $d_5$ 2.100 | $N_3$ 1.77250 | $\nu_3$ 49.77 |
| | $r_6$ | 57.641 | | | |
| | | | $d_6$ 4.500 | $N_4$ 1.80518 | $\nu_4$ 25.43 |
| | $r_7$ | 163.111 | | | |

TABLE 3-continued

[Example 3]
$f = 28.7 \sim 50.0 \sim 83.0 \quad F_{No.} = 4.1$

| | | Radius of Curvature | Axial Distance | Refractive Index | Abbe Number |
|---|---|---|---|---|---|
| | | | $d_7$ 44.395 $\sim$ 15.837 $\sim$ 1.000 | | |
| $L_2$ | $r_8$ | 89.213 | | | |
| | | | $d_8$ 4.700 | $N_5$ 1.77250 | $\nu_5$ 49.77 |
| | $r_9$ | −41.917 | | | |
| | | | $d_9$ 1.500 | $N_6$ 1.75000 | $\nu_6$ 25.14 |
| | $r_{10}$ | 89.077 | | | |
| | | | $d_{10}$ 4.500 | $N_7$ 1.66892 | $\nu_7$ 45.01 |
| | $r_{11}$ | −77.829 | | | |
| | | | $d_{11}$ 0.150 | | |
| | $r_{12}$ | 25.625 | | | |
| | | | $d_{12}$ 3.800 | $N_8$ 1.67000 | $\nu_8$ 57.07 |
| | $r_{13}$ | 92.999 | | | |
| | | | $d_{13}$ 2.000 $\sim$ 4.806 $\sim$ 10.553 | | |
| $L_3$ | $r_{14}$ | 181.053 | | | |
| | | | $d_{14}$ 3.000 | $N_9$ 1.75520 | $\nu_9$ 27.51 |
| | $r_{15}$ | −38.021 | | | |
| | | | $d_{15}$ 1.300 | $N_{10}$ 1.69680 | $\nu_{10}$ 55.43 |
| | $r_{16}$ | 51.030 | | | |
| | | | $d_{16}$ 1.800 | | |
| | $r_{17}$ | −59.807 | | | |
| | | | $d_{17}$ 1.200 | $N_{11}$ 1.60311 | $\nu_{11}$ 60.74 |
| | $r_{18}$ | 43.492 | | | |
| | | | $d_{18}$ 11.553 $\sim$ 8.747 $\sim$ 3.000 | | |
| $L_4$ | $r_{19}$ | 108.383 | | | |
| | | | $d_{19}$ 1.200 | $N_{12}$ 1.80741 | $\nu_{12}$ 31.59 |
| | $r_{20}$ | 26.485 | | | |
| | | | $d_{20}$ 4.500 | $N_{13}$ 1.61272 | $\nu_{13}$ 58.52 |
| | $r_{21}$ | −33.088 | | | |
| | | | $d_{21}$ 0.150 | | |
| | $r_{22}$ | 41.284 | | | |
| | | | $d_{22}$ 6.000 | $N_{14}$ 1.67000 | $\nu_{14}$ 57.07 |
| | $r_{23}$ | −15.778 | | | |
| | | | $d_{23}$ 1.500 | $N_{15}$ 1.74250 | $\nu_{15}$ 52.51 |
| | $r_{24}$ | 54.258 | | | |

$\Sigma d = 115.298 \sim 86.740 \sim 71.903$
$f_1 = -44.444, f_2 = 28.571, f_3 = -31.250, f_4 = 52.198$

TABLE 4

[Example 4]
$f = 28.7 \sim 50.0 \sim 83.0 \quad F_{No.} = 4.1$

| | | Radius of Curvature | Axial Distance | Refractive Index | Abbe Number |
|---|---|---|---|---|---|
| $L_1$ | $r_1$ | 1113.671 | | | |
| | | | $d_1$ 4.000 | $N_1$ 1.51680 | $\nu_1$ 64.12 |
| | $r_2$ | −256.950 | | | |
| | | | $d_2$ 0.150 | | |
| | $r_3$ | 254.511 | | | |
| | | | $d_3$ 2.500 | $N_2$ 1.80750 | $\nu_2$ 35.45 |
| | $r_4$ | 31.529 | | | |
| | | | $d_4$ 9.200 | | |
| | $r_5$ | −402.311 | | | |
| | | | $d_5$ 2.100 | $N_3$ 1.51680 | $\nu_3$ 64.12 |
| | $r_6$ | 34.810 | | | |
| | | | $d_6$ 6.000 | $N_4$ 1.80518 | $\nu_4$ 25.43 |
| | $r_7$ | 105.930 | | | |
| | | | $d_7$ 57.136 $\sim$ 20.802 $\sim$ 1.000 | | |
| $L_2$ | $r_8$ | 86.466 | | | |
| | | | $d_8$ 1.500 | $N_5$ 1.75000 | $\nu_5$ 25.14 |
| | $r_9$ | 33.407 | | | |
| | | | $d_9$ 6.500 | $N_6$ 1.77250 | $\nu_6$ 49.77 |
| | $r_{10}$ | −41.419 | | | |
| | | | $d_{10}$ 1.500 | $N_7$ 1.80518 | $\nu_7$ 25.43 |
| | $r_{11}$ | −76.708 | | | |
| | | | $d_{11}$ 0.150 | | |
| | $r_{12}$ | 26.690 | | | |
| | | | $d_{12}$ 4.000 | $N_8$ 1.67000 | $\nu_8$ 57.07 |
| | $r_{13}$ | 74.115 | | | |
| | | | $d_{13}$ 3.000 $\sim$ 6.221 $\sim$ 11.479 | | |
| $L_3$ | $r_{14}$ | 408.916 | | | |
| | | | $d_{14}$ 3.000 | $N_9$ 1.80518 | $\nu_9$ 25.43 |
| | $r_{15}$ | −43.388 | | | |
| | | | $d_{15}$ 1.200 | $N_{10}$ 1.69680 | $\nu_{10}$ 55.43 |
| | $r_{16}$ | 46.721 | | | |
| | | | $d_{16}$ 1.797 | | |
| | $r_{17}$ | −70.031 | | | |

TABLE 4-continued

[Example 4]
$f = 28.7 \sim 50.0 \sim 83.0$   $F_{No.} = 4.1$

| | Radius of Curvature | | Axial Distance | Refractive Index | | Abbe Number | |
|---|---|---|---|---|---|---|---|
| | $r_{18}$ | 95.768 | | | | | |
| | | | $d_{17}$ | 1.300 | $N_{11}$ 1.60311 | $\nu_{11}$ | 60.74 |
| | $r_{19}$ | 189.882 | $d_{18}$ | $9.500 \sim 6.560 \sim 1.500$ | | | |
| | $r_{20}$ | 17.866 | $d_{19}$ | 1.200 | $N_{12}$ 1.80750 | $\nu_{12}$ | 35.45 |
| $L_4$ | $r_{21}$ | $-38.980$ | $d_{20}$ | 4.300 | $N_{13}$ 1.60311 | $\nu_{13}$ | 60.74 |
| | $r_{22}$ | 249.057 | $d_{21}$ | 0.140 | | | |
| | $r_{23}$ | $-16.731$ | $d_{22}$ | 6.000 | $N_{14}$ 1.67000 | $\nu_{14}$ | 57.07 |
| | $r_{24}$ | $-294.053$ | $d_{23}$ | 1.500 | $N_{15}$ 1.74250 | $\nu_{15}$ | 52.51 |

$\Sigma d = 127.674 \sim 91.620 \sim 72.016$
$Ff_1 = -48.309, f_2 = 28.801, f_3 = -39.142, f_4 = 105.001$

TABLE 5

[Example 5]
$f = 28.7 \sim 50.0 \sim 83.0$   $F_{No.} = 4.1$

| | Radius of Curvature | | Axial Distance | Refractive Index | | Abbe Number | |
|---|---|---|---|---|---|---|---|
| | $r_1$ | $\infty$ | | | | | |
| | | | $d_1$ | 4.000 | $N_1$ 1.51680 | $\nu_1$ | 64.12 |
| | $r_2$ | $-354.222$ | $d_2$ | 0.150 | | | |
| | $r_3$ | 154.099 | $d_3$ | 2.500 | $N_2$ 1.80750 | $\nu_2$ | 35.45 |
| $L_1$ | $r_4$ | 32.955 | $d_4$ | 9.200 | | | |
| | $r_5$ | $-378.870$ | $d_5$ | 2.100 | $N_3$ 1.51680 | $\nu_3$ | 64.12 |
| | $r_6$ | 29.449 | $d_6$ | 6.000 | $N_4$ 1.80518 | $\nu_4$ | 25.43 |
| | $r_7$ | 59.444 | $d_7$ | $49.231 \sim 17.761 \sim 1.500$ | | | |
| | $r_8$ | 55.928 | $d_8$ | 1.500 | $N_5$ 1.80518 | $\nu_5$ | 25.43 |
| | $r_9$ | 23.990 | $d_9$ | 6.500 | $N_6$ 1.69680 | $\nu_6$ | 55.43 |
| $L_2$ | $r_{10}$ | $-76.282$ | $d_{10}$ | 0.150 | | | |
| | $r_{11}$ | 30.576 | $d_{11}$ | 3.500 | $N_7$ 1.67000 | $\nu_7$ | 57.07 |
| | $r_{12}$ | 140.085 | $d_{12}$ | $2.000 \sim 8.231 \sim 17.164$ | | | |
| | $r_{13}$ | $-109.277$ | $d_{13}$ | 2.500 | $N_8$ 1.80518 | $\nu_8$ | 25.43 |
| | $r_{14}$ | $-33.822$ | $d_{14}$ | 1.200 | $N_9$ 1.69680 | $\nu_9$ | 55.43 |
| $L_3$ | $r_{15}$ | 55.800 | $d_{15}$ | 1.760 | | | |
| | $r_{16}$ | 298.534 | $d_{16}$ | 1.200 | $N_{10}$ 1.69680 | $\nu_{10}$ | 55.43 |
| | $r_{17}$ | 65.044 | $d_{17}$ | $17.664 \sim 11.433 \sim 2.500$ | | | |
| | $r_{18}$ | 50.887 | $d_{18}$ | 1.200 | $N_{11}$ 1.80750 | $\nu_{11}$ | 35.45 |
| | $r_{19}$ | 19.530 | $d_{19}$ | 5.000 | $N_{12}$ 1.60311 | $\nu_{12}$ | 60.74 |
| $L_4$ | $r_{20}$ | $-41.041$ | $d_{20}$ | 0.120 | | | |
| | $r_{21}$ | 42.397 | $d_{21}$ | 4.800 | $N_{13}$ 1.67000 | $\nu_{13}$ | 57.07 |
| | $r_{22}$ | $-17.303$ | $d_{22}$ | 1.500 | $N_{14}$ 1.74250 | $\nu_{14}$ | 52.51 |
| | $r_{23}$ | 32.693 | | | | | |

$\Sigma d = 123.775 \sim 92.305 \sim 76.044$
$f_1 = -41.824, f_2 = 28.384, f_3 = -39.021, f_4 = 80.854$ FIGS. 2, 6, 10, 14 and 18 correspond to the first to fifth embodiments in Tables 1 to 5, respectively. As is apparent from those Figures, a light shielding stop (A) with a fixed diameter is provided behind the fourth lens group ($L_4$) and axially moved during the zooming. This stop (A) is for removing the meridional flare appearing in the zonal to marginal area during the zooming from the medium to longest focal length. In the Figures, (S) represents the conventional aperture stop comprising the iris diaphragm. FIGS. 3 to 5, 7 to 9, 11 to 13, 15 to 17, and 19 to 21 correspond to various aberrations in various focal lengths of the first to fifth embodiments, respectively.

Figure 14:
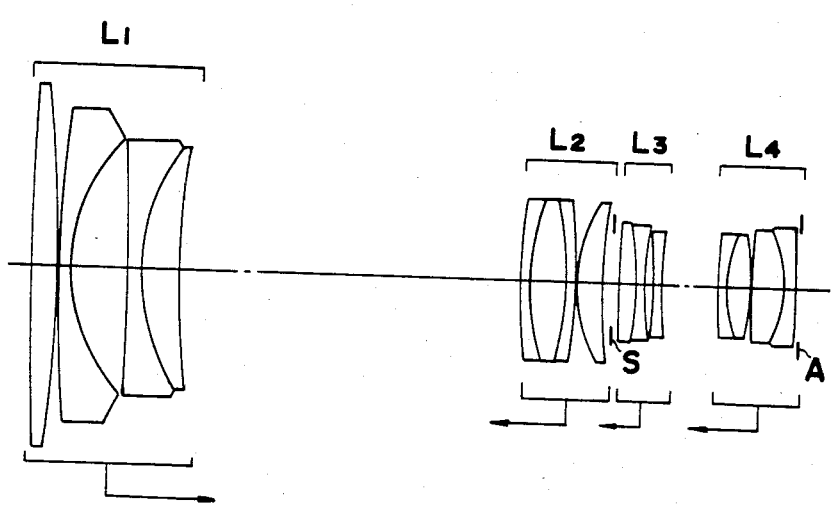
FIG. 14 represents a cross sectional view of the lens system according to a fourth embodiment of the present invention for the shortest focal length.
Figure 18:
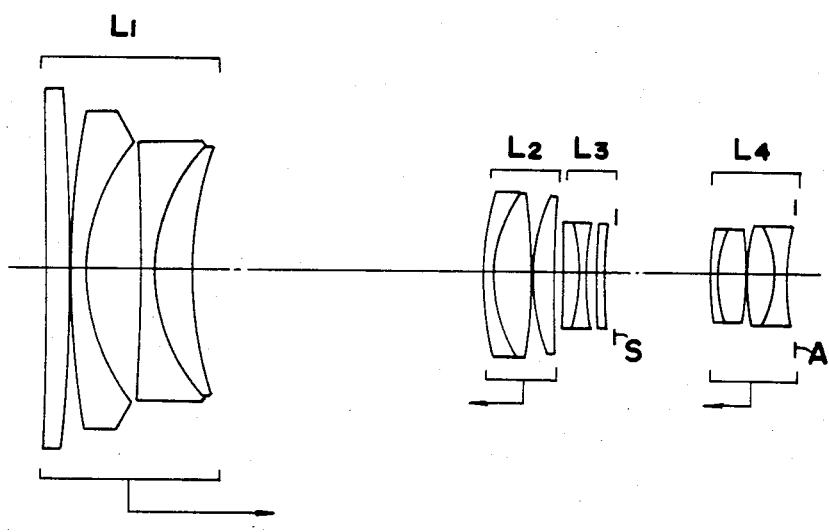
FIG. 18 represents a cross sectional view of the lens system according to a fifth embodiment of the present invention for the shortest focal length.
Figure 19A:
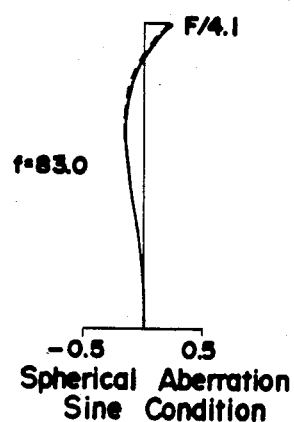
FIGS. 19a to 19c represent the aberration curves of the fifth embodiment for the longest focal length.
Figure 19B:
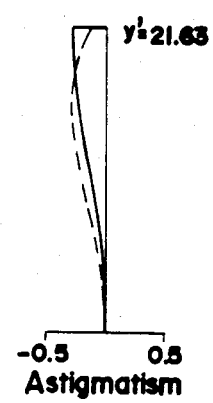
Figure 19C:
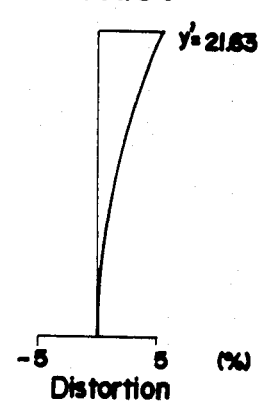
Figure 20A:
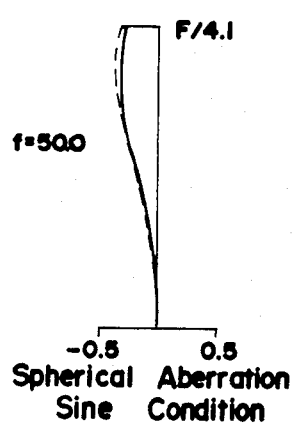
FIGS. 20a to 20c represent the aberration curves of the fifth embodiment for a medium focal length.
Figure 20B:
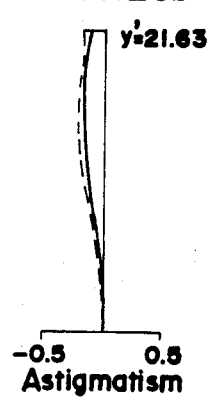
Figure 20C:
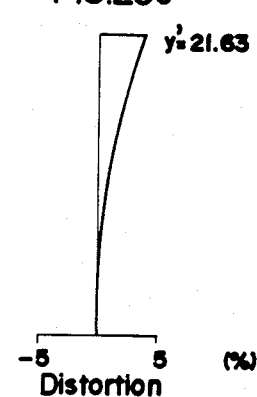
Figure 21A:
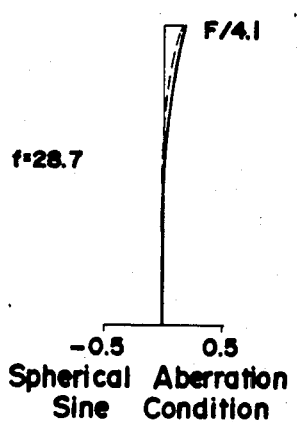
FIGS. 21a to 21c represent the aberration curves of the fifth embodiment for the shortest focal length.
Figure 21B:
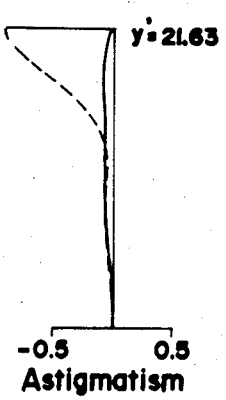
Figure 21C:
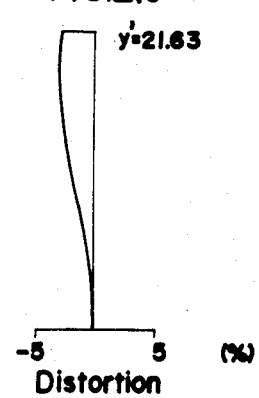

In the above embodiments, the fourth embodiment in Table 4 and FIG. 14 includes the second to fourth lens groups each moving independently from the others. The freedom of aberration correction is maximum in this embodiment, although the lens barrel mechanism for controlling the lens group movement is most complex.

The first to third and fifth embodiments are designed so as to simplify the lens barrel mechanism by means of decreasing the number of zooming cams. In the first to third embodiments, the second and fourth lens groups are moved in a body. In this case, the possibility of manufacturing error is reduced by means of the common holding of the second and fourth lens groups, although a little difficulty in balancing the corrections between spherical aberration and astigmatism may be caused. On the other hand, the fifth embodiment comprises a third lens group ($L_3$) fixed during the zooming. In this case, the aperture stop (S) which is requested to be located at the third lens group can also be favorably fixed, although a little difficulty in correcting the astigmatism in the shorter focal length side and the distortion in the longer focal length side may be caused.

With respect to the focusing, the conventional method by means of moving the first lens group is of course applicable to the lens system according to the present invention. The maximum magnification for the shorter focal length side, however, may be insufficient in comparison with that for the longer focal length side. For the purpose of increasing the magnification for the shorter focal length side, the present invention also provides a macro focusing method by means of moving at least a part of the second to fourth lens groups with the remaining part of the lens system left stationary.

In more detail the following methods are possible for example:

(a) to move all the second to fourth lens groups toward the object side with the movement of the third lens group different from those of the second and fourth lens groups for changing the air spaces on both sides of the third lens group; or (b) to move the second and fourth lens groups toward the object side in a body with the third lends group left stationary; or (c) to move only the third lens group toward the image side.

Figure 22A:
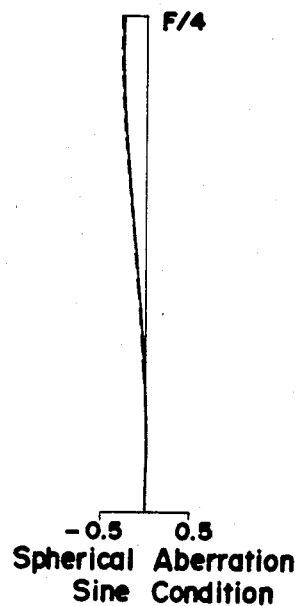
FIGS. 22a to 22c represent the aberration curves of the fourth embodiment for a macro focusing in a first method.
Figure 22B:
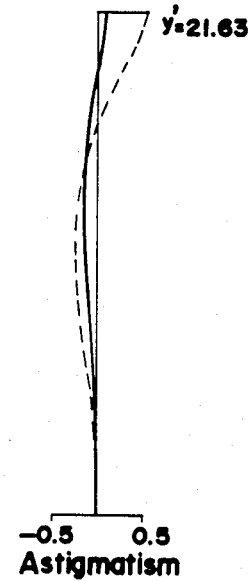
Figure 22C:
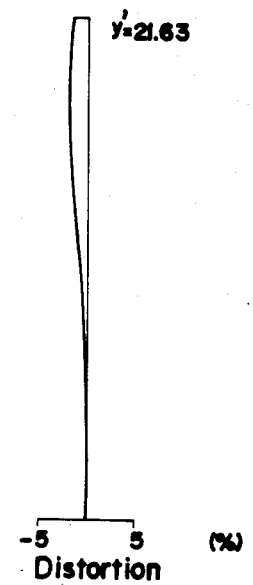

The above method (a) is favorable to correct the deterioration of field curvature and coma apt to be caused through macro focusing. For an example of this method, a macro focusing to a magnification, $-0.25 \text{X}$ is possible by means of moving the second and fourth lens groups in a body by 5.2 mm and the third lens group by 3.9 mm with respect to the fourth embodiment. FIGS. 22a to 22c correspond to the aberration curves of this case.

Figure 23A:
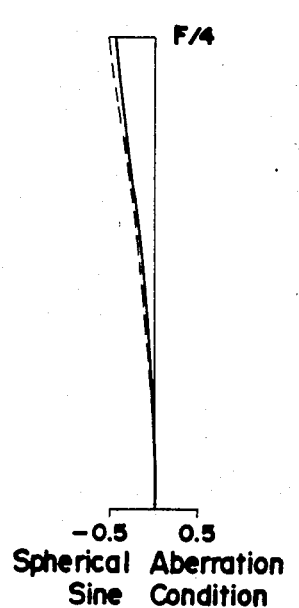
FIGS. 23a to 23c represent the aberration curves of the fourth embodiment for a macro focusing in a second method.
Figure 23B:
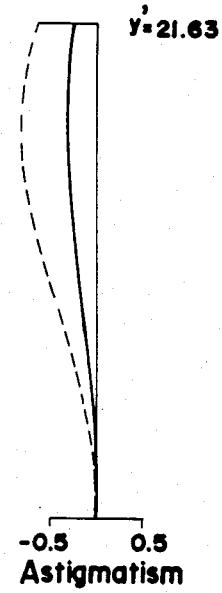
Figure 23C:
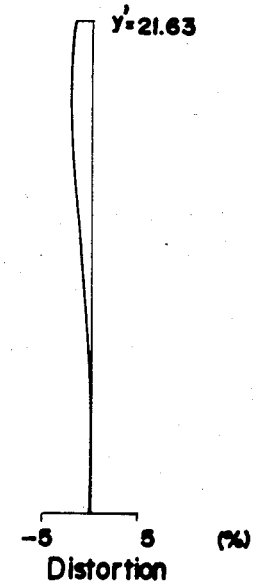
Figure 24A:
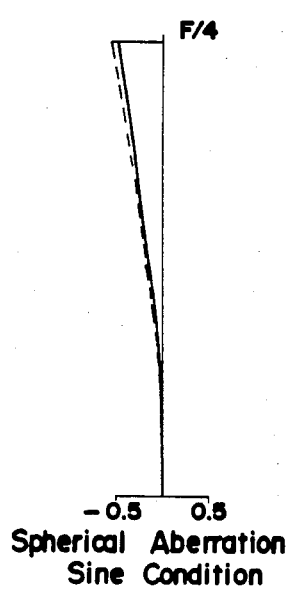
FIGS. 24a to 24c represent the aberration curves of the fourth embodiment for a macro focusing in a third method.
Figure 24B:
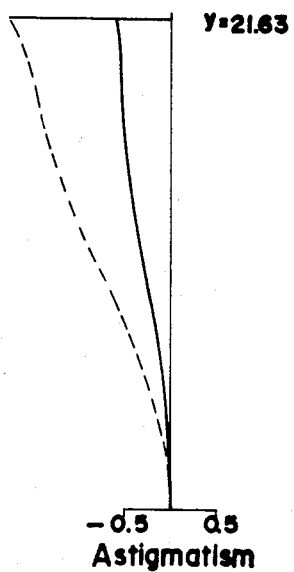
Figure 24C:
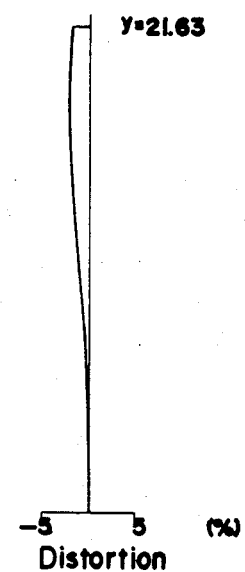

The above methods (b) and (c) are relatively simple in lens movement in comparison with the method (a), although the most ideal optical performance may not be reached. For an example of the method (b), a macro focusing to −0.25 X is possible by means of moving the second and fourth lens groups of the fourth embodiment in a body by 1.9 mm. FIGS. 23a to 23c correspond to the aberration curves of this case. Finally, for an example of the method (c), a macro focusing to −0.25 X is possible by means of moving the third lens group of the fourth embodiment by 2.3 mm. FIGS. 24a to 24c correspond to the aberration curves of this case.

As will be understood by aberration curves in FIGS. 22a to 24c, the macro focusing methods (a) to (c) can provide a macro focusing to −0.25 X with a satisfactory optical performance maintained.

As can be readily appreciated, it is possible to deviate from the above embodiments of the present invention and, as will be readily understood by those skilled in the optical art, the invention is capable of many modifications and improvements within the scope and spirit thereof. Accordingly, it will be understood that the invention is not to be limited by these specific embodiments, but only by the scope and spirit of the appended claims.

What is claimed is:

1. A zoom lens system comprising:
 a first lens unit of a negative refractive power;
 a second lens unit of a positive refractive power located on the image side of the first lens unit with a first variable air space between the first and second lens unit;
 a third lens unit of a negative refractive power located on the image side of the second lens unit with a second variable air space between the second and third lens units; and
 a fourth lens unit of a positive refractive power located on the image side of the third lens unit with a third variable air space between the third lens unit and the fourth lens unit, wherein the first and third variable air spaces are reduced and the second variable air space is increased in accordance with an increase of the focal length of the whole lens system during zooming, wherein the lens system fulfills the following condition:

$$1 < \frac{|f_3|}{f_2} < 2$$

whereby:
 $f_2$ represents the focal length of the second lens unit; and
 $f_3$ represents the focal length of the third lens unit.

2. The invention of claim 1, wherein the lens system further fulfills the following condition:

$$1.5 f_w < f_4 < 10 f_w$$

wherein:
 $f_4$ represents the focal length of the fourth lens unit; and
 $f_w$ represents the shortest focal length of the whole lens system.

3. The invention of claim 1, wherein the lens system further fulfills the following conditions:

$$f_2 < |f_1|$$
$$|f_3| < f_4$$

wherein:

$f_1$ represents the focal length of the first lens unit; and
$f_4$ represents the focal length of the fourth lens unit.

4. The invention of claim 1, wherein the lens system further fulfills the following condition:

$$7\ mm < l_3 < 20\ mm$$

wherein:
 $l_3$ represents the greatest value for the third variable air space.

5. The invention of claim 1, wherein the second and fourth lens units are moved in a body during the zooming.

6. The invention of claim 1, wherein the third lens unit is left stationary during the zooming.

7. The invention of claim 1, wherein at least a part of the second to fourth lens units are movable for macrofocusing with the remaining part of the lens system left stationary.

8. The invention of claim 7, wherein all the second to fourth lens units are movable toward the object side for macrofocusing.

9. The invention of claim 8, wherein the movement of the third lens unit for macrofocusing is different from those of the second and fourth lens units.

10. The invention of claim 7, wherein the second and fourth lens units are movable toward the object side in a body for macrofocusing with the third lens unit left stationary.

11. The invention of claim 7, wherein only the third lens unit is movable toward the image side for macrofocusing.

12. A zoom lens system comprising:
 a first lens unit of a negative refractive power;
 a second lens unit of a positive refractive power located on the image side of the first lens unit with a first variable air space between the first and second lens units;
 a third lens unit of a negative refractive power located on the image side of the second lens unit with a second variable air space between the second and third lens units; and
 a fourth lens unit of a positive refractive power located on the image side of the third lens unit with a third variable air space between the third lens unit and fourth lens unit, wherein the first and third variable air spaces are reduced and the second variable air space is increased in accordance with an increase of the focal length of the whole lens system upon zooming, and wherein the lens system fulfills the following condition:

$$1.5 f_w < f_4 < 10 f_w$$

wherein:
 $f_4$ represents the focal length of the fourth lens unit; and
 $f_w$ represents the shortest focal length of the whole lens system.

13. A zoom lens system comprising the following design parameters:

| $f = 28.7 \sim 50.0 \sim 83.0 \quad F_{No.} = 4.1$ | | | |
| --- | --- | --- | --- |
| Radius of Curvature | Axial Distance | Refractive Index | Abbe Number |
| $r_1$ −1346.691 | | | |
| | $d_1$ 4.000 | $N_1$ 1.51680 | $\nu_1$ 64.12 |
| $r_2$ −175.382 | | | |

-continued

| | | $f = 28.7\sim50.0\sim83.0$ $F_{No.} = 4.1$ | | | |
|---|---|---|---|---|---|
| | | Radius of Curvature | Axial Distance | Refractive Index | Abbe Number |
| | | | $d_2$ 0.150 | | |
| $L_1$ | $r_3$ | 518.632 | | | |
| | | | $d_3$ 2.500 | $N_2$ 1.80741 | $\nu_2$ 31.59 |
| | $r_4$ | 28.654 | | | |
| | | | $d_4$ 8.600 | | |
| | $r_5$ | 193.102 | | | |
| | | | $d_5$ 2.100 | $N_3$ 1.51680 | $\nu_3$ 64.12 |
| | $r_6$ | 27.382 | | | |
| | | | $d_6$ 7.100 | $N_4$ 1.80518 | $\nu_4$ 25.43 |
| | $r_7$ | 78.340 | | | |
| | | | $d_7$ 59.086~22.095~1.000 | | |
| | $r_8$ | 39.131 | | | |
| | | | $d_8$ 1.500 | $N_5$ 1.80518 | $\nu_5$ 25.43 |
| $L_2$ | $r_9$ | 20.790 | | | |
| | | | $d_9$ 7.500 | $N_6$ 1.67000 | $\nu_6$ 57.07 |
| | $r_{10}$ | −76.684 | | | |
| | | | $d_{10}$ 0.150 | | |

-continued

| | | $f = 28.7\sim50.0\sim83.0$ $F_{No.} = 4.1$ | | | |
|---|---|---|---|---|---|
| | | Radius of Curvature | Axial Distance | Refractive Index | Abbe Number |
| | $r_{11}$ | 30.675 | | | |
| | | | $d_{11}$ 4.000 | $N_7$ 1.67000 | $\nu_7$ 57.07 |
| | $r_{12}$ | 100.011 | | | |
| | | | $d_{12}$ 3.000~5.763~10.823 | | |
| | $r_{13}$ | −183.420 | | | |
| | | | $d_{13}$ 3.000 | $N_8$ 1.75520 | $\nu_8$ 27.51 |
| | $r_{14}$ | −38.057 | | | |
| $L_3$ | $r_{15}$ | 57.414 | $d_{14}$ 1.300 | $N_9$ 1.69680 | $\nu_9$ 55.43 |
| | $r_{16}$ | −410.268 | $d_{15}$ 1.800 | | |
| | $r_{17}$ | 69.570 | $d_{16}$ 1.300 | $N_{10}$ 1.60311 | $\nu_{10}$ 60.74 |
| | | | $d_{17}$ 9.322~6.559~1.499 | | |
| | $r_{18}$ | 188.113 | | | |
| $L_4$ | $r_{19}$ | 15.601 | $d_{18}$ 1.200 | $N_{11}$ 1.80700 | $\nu_{11}$ 39.71 |
| | $r_{20}$ | −43.142 | $d_{19}$ 6.000 | $N_{12}$ 1.60000 | $\nu_{12}$ 64.38 |

$\Sigma d = 123.608\sim86.617\sim65.522$
$f_1 = -48.309, f_2 = 27.201, f_3 = -39.318, f_4 = 185.391$

* * * * *

UNITED STATES PATENT OFFICE
CERTIFICATE OF CORRECTION

Patent No. 4,516,839 . Dated May 14, 1985

Inventor(s) Hisashi Tokumaru

It is certified that error appears in the above-identified patent and that said Letters Patent are hereby corrected as shown below:

On the Face Sheet, Item [22] delete "1985" and insert --1982--.

In Column 1, line 46, after "difficult" insert --to--.
In Column 5, line 15, delete "a" and insert --are--.
In Column 6, line 3, delete "results" and insert --result--.

Signed and Sealed this

Fifteenth Day of October 1985

[SEAL]

Attest:

Attesting Officer

DONALD J. QUIGG

Commissioner of Patents and
Trademarks—Designate